Dec. 15, 1931.    M. J. TRUMBLE    1,836,139
FURNACE FOR MAKING STEEL
Original Filed Dec. 13, 1927    2 Sheets-Sheet 1
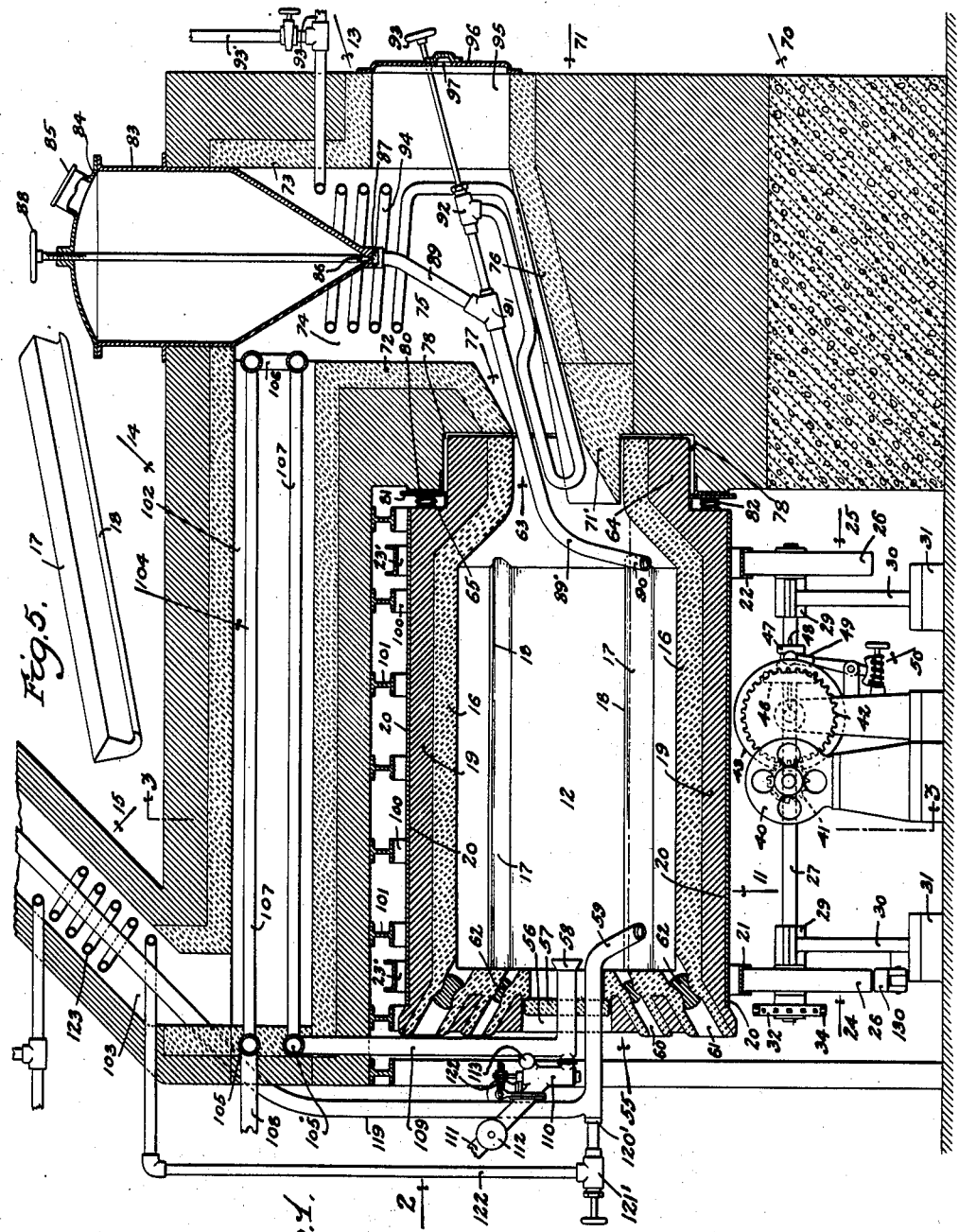
INVENTOR
MILON J. TRUMBLE
*Frank H. Palmahan*
ATTORNEY Dec. 15, 1931.  M. J. TRUMBLE  1,836,139
FURNACE FOR MAKING STEEL
Original Filed Dec. 13, 1927  2 Sheets-Sheet 2
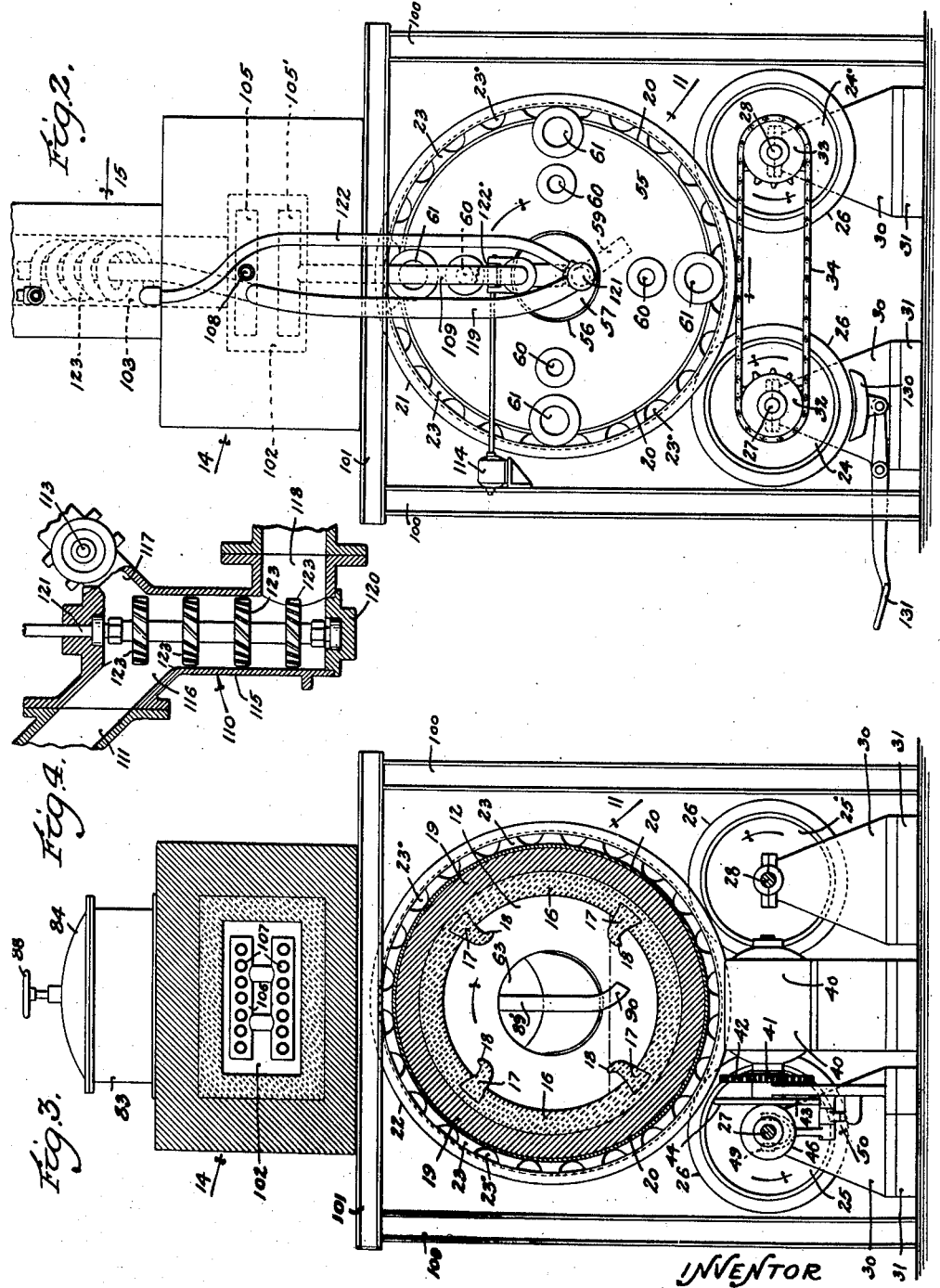
INVENTOR
MILON J. TRUMBLE
ATTORNEY Patented Dec. 15, 1931

1,836,139

UNITED STATES PATENT OFFICE

MILON J. TRUMBLE, OF ALHAMBRA, CALIFORNIA; FRANCIS M. McDONNELL ADMINISTRATOR OF SAID MILON J. TRUMBLE, DECEASED

FURNACE FOR MAKING STEEL

Application filed December 13, 1927, Serial No. 239,658. Renewed August 15, 1931.

My invention relates to a type of furnace used in the manufacture of steel, and a process for using same whereby steel of any desired carbon content may be made directly from the ore in a minimum of time with a maximum heat efficiency.

It is a primary object of my invention to produce a furnace and a process for using same whereby I may largely eliminate the use of coal or coke in the refinement of iron ore.

It is a further object of my invention to produce a furnace whereby steel of any desired carbon content may be made directly from ore, scrap iron, or pig iron, in a semi-continuous process, being more particularly a furnace of the rotary type in which I maintain a uniform temperature throughout and in which I employ a gas or an oil flame for the reduction of the oxides in the ore.

It is a further object of my invention to produce a furnace in which the carbon content of the steel may be controlled during the smelting of ore, and in which the carbon may optionally be introduced directly into the molten charge without direct subjection to the furnace flame, in case the carbon residue from the flame is found to be insufficient to give the desired steel composition.
It is a still further object of my invention to develop a process particularly adapted to the use of the mentioned furnace in which the molten metallic charge in the furnace is intermittently carried above a reducing flame and poured through the mentioned flame yielding a maximum reducing action which is unattainable in any of the stationary or oscillating types of furnaces commonly used.

Another feature of this process is that superheated steam may be used for the injection of ore into the furnace, the steam being heated to the point of dissociation and the hydrogen thereof being effective to remove the sulphur compounds from the ore.
I have further developed the use of a new and highly efficient flux particularly adapted to the refining of magnetite ore in the mentioned process.

Other objects and advantages of my invention, including features of construction yielding high thermal efficiency and flexibility of control, will be better understood from an illustrative embodiment of same as shown in the accompanying drawings in which Fig. 1 is a sectional elevation showing one embodiment of my invention;

Fig. 2 is an elevational view in the direction of the arrow 2 of Fig. 1;

Fig. 3 is a sectional view along the line 3—3 of Fig. 1;

Fig. 4 is a sectional view of a type of oil atomizer used in connection with my invention; and Fig. 5 is a perspective view of a projecting rib used in the furnace.

More particularly describing my invention as herein illustrated, 11 indicates a rotary furnace member having an inner furnace chamber 12 which communicates through a vertical flue member 13 and a horizontal flue member 14 with a stack 15.

The furnace 11 comprises a substantially cylindrical interior high refractory section 16, which I prefer to make from silica brick, but which may be made of any high refractory substance chemically resistant to the charge used in the furnace. This interior section is further provided with a plurality of inwardly extending puddling ribs 17, which may be made from specially case high refractory brick, (Fig. 5), having a forward projection 18 thereon adapted to give a thorough agitating or puddling action to the contents of the furnace. It will be understood from parts of the following description that the ribs 17 tend to lift the plastic contents of the furnace to an upward position and allow the same to fall or flow downwardly through a reducing and carbonizing flame projected from a suitably arranged burner.

The section 19 which surrounds the interior high refractory section 16 of the furnace 11 is made up of an insulating substance such as sil-o-cel brick, and is surrounded by a metal shell 20. The opposite ends of the shell 20 are outwardly provided with annular channel members 21 and 22 which are spaced from the shell by a plurality of spacing members 23, forming an air space 23' between the shell and the channel. Each of the channels 21 and 22 rests upon a pair of supporting wheels 24—24′ and 25—25′ respectively, and the mentioned wheels are provided with resilient peripheries, such as the rubber tires 26, to obviate any undue jarring of the furnace during rotation, and to assure a positive frictional contact between the mentioned wheels and the channels. It will be understood that the insulating section 19 and the air space 23′ prevent the rubber or other resilient substance used from being affected by the heat of the furnace.

The wheels 24—25 and 24′—25′ are mounted on shafts 27 and 28, the shafts being supported in bearings 29 upwardly mounted on supporting standard 30. The standards 30 are shown as being mounted on a suitable foundation 31. The shafts 27 and 28 are further provided with interconnecting means such as the sprocket wheels 32 and 33 and the chain 34. The numeral 40 indicates a motor which is geared directly through gears 41 and 42 to a friction disc 43. The face 44 of this disc is adapted to engage an edge of a friction plate 46 formed on a sleeve 47 slidably mounted upon shaft 27 or 28 and keyed against rotation relative thereto in a groove 48. The sleeve 47 is provided with means for its lateral adjustment relative to the shaft 27, such as the yoke 49 and the rack and lever organization indicated at 50. By means of this organization the rotation of the furnace may easily be adjusted to any desired speed.

The forward face 55 of the furnace is provided with a central opening 56 which receives a stationary refractory plate 57 through which a burner 58 and a charging pipe 59 extend. The face 55 is further provided with a plurality of slag and steel withdrawal openings 60 and 61 respectively, and it will be understood that in withdrawing any of the furnace contents, the furnace is stopped in a position substantially as indicated in Figs. 1 or 2, so that one of the sets of withdrawal openings are in the lowermost portion of the furnace. These draw openings 60 and 61 are provided with suitable plug members 62 which may be of any preferred type, such as clay plugs inserted in the form of mud after a charge has been withdrawn. The inner end of the furnace is provided with a flue outlet opening 63 which is formed within a substantially cylindrical annular projection 64, extending outwardly from an annular shoulder 65 on the inner end of the furnace.

The vertical flue member 13 is supported upon any suitable foundation 70, and comprises a base member 71, and inside vertical wall 72, a rear wall 73 and side walls indicated at 74 which enclose a vertical flue chamber 75. The base member 71 is provided with an upper refractory face 76, which slopes downwardly and inwardly and terminates in a sloping refractory block 71′ which may be readily removed and replaced by removing the base member 71, and the inner wall 72 is provided with an opening 77 which communicates with the gas outlet opening 63 in the rear end of the furnace. An annular channel 78 is formed on the "furnace side" of the inner wall 72 and the base member 71. This channel surrounds the flue outlet opening 63 of the furnace and receives the projection 64 as shown in Fig. 1. In order that there may be a substantially gas-tight yet rotatable relation between the furnace and the vertical flue member, the projection 64 is surrounded with a pair of engaging annular metal plate rings 80 and 81, the former being rigidly mounted in the vertical flue member and the latter being fixed relative to the furnace member and held in firm engagement with plate 80 by means of a plurality of spiral springs 82.

Upwardly mounted in the vertical flue chamber 75 I provide an ore hopper 83, which has a cover 84 having an ore charging opening 85 formed thereon. The hopper 83 is provided with a needle valve 88 extending through the cover 84. The outlet opening 87 is connected through a pipe 89 with an injecting pipe 89′. The injecting pipe 89′ extends into the furnace through the rear opening 63 and the inner end is provided with a downward projection 90, which terminates in the region of the inner chamber near the rear end of the furnace in a position which permits a slight clearance from the inwardly projecting ribs 17. By bringing the terminal end of the injecting projection 90 to the point described, as is best illustrated in Figs. 1 and 3, the charge is introduced into the molten or plastic furnace contents and is allowed to mix therewith before being subjected to the direct action of the flame. In case carbon is being added with or without the ore, to bring the steel up to the desired composition, this is an important feature since in this manner the carbon is mixed with the steel before it has an opportunity to burn. The injecting pipe 89′ is provided with a steam injector 91 connected, through a valve 92 having an operating handle 93, with a superheating coil 94 in the flue chamber 75. The superheater 94 is connected with a steam line 93. The steam line 93 is further provided with a connection to a high pressure gas line 93′ by means of which gas may be injected into the furnace with the steam for a certain carbonizing effect upon the ore and to aid in maintaining a uniform temperature in the furnace through the combustion of the gas when released. The rear wall 73 is provided with an opening 95 through which the flux may be introduced or which may be used for making repairs, etc. This opening is closed by a door 96, which may be provided with a peep hole 97.

The horizontal flue member 14 is supported above the rotary furnace by means of a series of channel columns 100 and beams 101. This flue member has an inner chamber 102 which communicates between the vertical flue chamber 75 and opening 103 in the stack 15.

A compressed air heater 104 is mounted in the horizontal flue chamber 102 and consists of a pair of headers 105—105' and 106 and a plurality of interconnecting pipes 107. The header 105' is provided with an inlet pipe 108 leading to a source of compressed air (not shown), and an outlet pipe 109 extends from the header 105' to the burner 58.

The burner 58 may be of any preferred type, but I have found particular satisfaction in the use of a heavy oil for fuel in which case I use an atomizer 110 connected with an oil line 111 and provided with auxiliary connections with the hot air line 109 and the burner 58. The oil line 111 and the air line 109 are provided with valves 112 and 113 respectively for the purpose of controlling the burner flame.

The atomizer 110 is operated by a motor 114 and, as shown in section in Fig. 4, comprises a tubular member 115, having an oil inlet 116, an air inlet 117 and a mixture outlet 118. A vertical shaft 121 extends through the tubular member 115 and rests on a bearing plate 120 and extends upwardly through a gland, the upper end being provided with a worm gear 122 which is adapted to be driven by a worm 122' from the motor 114. The shaft 119 is provided with a plurality of circular vane members 123 which are rigidly mounted thereon, and during the rapid rotation of the shaft 121 by the motor 114 the oil from oil inlet 116 is thoroughly atomized and mixed with hot air from air inlet 117 to produce combustion mixture for outlet 118 which will yield any desired quality of ore reducing and carbonizing flame from the burner 58, depending upon the adjustment of valves 112 and 113.

The charging pipe 59 is provided in order that carbon, or ore, or carbon and ore may optionally be introduced into the front of the furnace for control purposes, and if desired, this pipe or other similar pipe may be provided for the injection of flux.

The pipe 59 is connected with a supply line 119 and is provided with a steam injector 120' having a control valve 121' connected with a steam supply line 122. The steam supply line and the charge supply line may be led through a part of the stack 15 for a preheating and superheating effect, such as indicated at 123. The source of the charge for the line 119 is not shown, but consists of an organization similar to hopper 85 located in any suitable position relative to the line 119.

Numeral 130 indicates a brake shoe which engages the wheel 24 and is operated by the lever 131 to stop the furnace in a position which is advantageous to the withdrawal of a part of the charge.

It has been found necessary, in the construction of the furnace, due to the very high temperature encountered, to use a highly refractory metal for the injection pipe and the superheater piping, and to use a high refractory brick for the lining of the furnace and flues. Calorized steel pipes have been employed with great satisfaction for the former purpose; and the composition of the lining is governed by the chemical activity of the charge used in the furnace. In the treatment of magnetic ore a high refractory silica brick may be used.

In the operation of my process in connection with the above described furnace, I have found that unusually satisfactory results are obtained through the use of black sand or magnetite iron ore having a fineness of about 80 mesh, in connection with basalt rock as a flux. Carbon, in the form of charcoal or coke, may be mixed with the ore before introducing into the furnace, or may be added independently through the injector 59 to obtain a finished steel of the desired carbon content. I have found, however, that the oil flame used in the furnace will produce sufficient carbon to give a low carbon steel of very high quality. An oil flame is used in the furnace to maintain a temperature of about 2200° F., and due to the constant mixing or puddling action, the furnace temperature is substantially uniform throughout its entire length. The flux may be added independently through the door 96 or may be ground and mixed with the ore. A small charge of ore, flux and carbon may be constantly injected into the furnace from the injector 90 during the rotation of the furnace, and the operation may be stopped from time to time to draw off some of the steel or the slag. Best results are obtained by making no attempt to draw off all of the slag, but to always keep a layer on top of the molten steel in the furnace. This tends to increase thermal efficiency by holding the heat in the steel and assures the removal of the infusible gangue of the ore.

It will be understood that my furnace and process are not limited to the above mentioned substances as ingredients, but that any desirable ore may be used in connection with any suitable flux, and that the furnace may be conveniently and satisfactorily used in the manufacture of steel from scrap iron, in which case the hopper 83 and attending parts are removed from the vertical flue member 13, and the chamber 75 is provided with a suitable cover. The scrap iron is then charged through the chamber 75 and may be worked into the furnace by any suitable means operable through the opening 95.

While I have herein described and illustrated one embodiment of my invention, it will be understood that various modifications of the same may be readily adapted by those familiar with the art without in any way departing from the spirit and scope of my invention as described above and in the following claims.

I claim as my invention:

1. An organization for smelting ore comprising: a rotary furnace; means for rotating said furnace; means for introducing ore into said furnace beneath the surface of the molten mass therein; means for introducing a flux into said furnace; means for introducing a reducing agent into said furnace beneath the surface of the molten mass therein; and means for projecting a flame into said furnace; the means for introducing said ore, said flux, and said reducing agent being operable during the rotation of said furnace.

2. An organization for smelting ore comprising: a rotary furnace; means for rotating said furnace; means for introducing ore into said furnace; means for introducing a reducing agent into said furnace; and means for projecting a flame into said furnace; said furnace being provided with a plurality of lifting ribs laterally disposed on the internal periphery of said furnace and adapted to intermittently lift the molten charge in said furnace and pour same through said flame.

3. In an organization for smelting ore: a substantially cylindrical furnace comprising an outer shell member; an intermediate insulating section; a high refractory lining; and inwardly projecting stirring members mounted on the inner surface of said furnace and arranged to stir the molten mass within said furnace; means for injecting a charge into said furnace beneath the surface of the molten mass therein; and means for rotating said furnace during the projection of said flame and the injection of said charge.

4. In an organization for smelting ore: a rotary furnace member; annular channel supporting members mounted on the external surface of said furnace member and thermally insulated therefrom; a plurality of oppositely disposed supporting wheels having a resiliently covered periphery in upward engagement with said channel members; means for synchronously rotating said wheels; and means for separately projecting a flame and injecting a charge into said furnace during the rotation thereof.

5. In an organization for smelting ore: a revolving furnace member; means for projecting a flame into one end of said furnace; means for withdrawing the hot gaseous products of combustion from the opposite end of said furnace; means for superheating steam by said products of combustion; means for preheating ore by said products of combustion; and means for injecting said superheated steam and said preheated ore into said revolving furnace.

6. In an organization for smelting ore: a revolving furnace member; means for projecting a flame into one end of said furnace member comprising an oil burner, oil delivering means, and means for delivering compressed air to said burner; means for withdrawing hot products of combustion from said furnace; means for delivering a charge of ore to said furnace; and means whereby said compressed air is heated by said products of combustion.

7. In an organization for smelting ore: a rotary furnace member; annular channel supporting members mounted on the external surface of said furnace members; a plurality of oppositely disposed supporting wheels in upward engagement with said channel members; means for synchronously rotating said wheels; and brake means for stopping said rotation when the furnace is in any desired position.

8. In an organization for smelting ore: a revolving furnace; means for heating said furnace; and means for injecting ore and a reducing agent beneath the surface of the molten mass within said furnace.

9. In an organization for smelting ore: a revolving furnace; means for heating said furnace; and means for injecting ore and superheated steam into said furnace beneath the surface of the molten mass therein.

In testimony whereof, I have hereunto set my hand at Los Angeles, California, this 30th day of November, 1927.

MILON J. TRUMBLE.